United States Patent [19]

Thorn et al.

[11] 4,368,636
[45] Jan. 18, 1983

[54] SYSTEM FOR HANDLING A VOLATILE AND FLAMMABLE LIQUID

[75] Inventors: Joseph H. Thorn; Robert E. Jennings, both of Indianapolis, Ind.

[73] Assignee: RCA Corporation, New York, N.Y.

[21] Appl. No.: 210,253

[22] Filed: Nov. 25, 1980

[51] Int. Cl.³ ............................................. G01M 3/04
[52] U.S. Cl. ..................................... 73/40.5 R; 48/193
[58] Field of Search ...................... 73/40.5 R; 48/193

[56] References Cited

U.S. PATENT DOCUMENTS

| | | | |
|---|---|---|---|
| 315,443 | 4/1885 | Randol | 48/193 |
| 318,901 | 5/1885 | Hoeveler | 48/193 |
| 2,727,811 | 12/1955 | Bunnell | 48/193 |
| 3,280,620 | 10/1966 | Anderson | 73/40.5 R |
| 3,338,254 | 8/1967 | Regal | 48/193 X |
| 3,531,264 | 9/1970 | Greipel | 73/40.5 R X |
| 3,874,222 | 4/1975 | Ladd et al. | 73/40.5 R |
| 4,261,204 | 4/1981 | Donaldson | 73/40.5 R X |

Primary Examiner—Edward R. Kazenske
Assistant Examiner—Joseph W. Roskos
Attorney, Agent, or Firm—Birgit E. Morris; Howard F. VanDenburgh

[57] ABSTRACT

A system and process for the safe supply, distribution, and delivery of a highly volatile and flammable liquid from a contained source of supply of the liquid remote from a closed work environment to a process area within the closed work environment includes a pipeline extending from within the contained supply to the process area within the closed work environment to provide for the delivery of the liquid from the supply to the process area. The system further includes a protective casing spaced from and completely enclosing the pipeline from a point on the pipeline adjacent the process area to a point on the pipeline closely adjacent the pipeline's entry into the closed work environment. The protective casing opens outwardly of the closed work environment to thereby trap within the space existing between the casing and the pipeline any vapors that may be escaping from the liquid within the pipeline for exhausting of the same outwardly of the closed work environment.

6 Claims, 2 Drawing Figures

SYSTEM FOR HANDLING A VOLATILE AND FLAMMABLE LIQUID

This invention relates to a system for the safe handling of a highly volatile, highly flammable liquid. More particularly, the present invention pertains to an apparatus and a process for safely controlling, distributing and handling, in a closed work place, a highly volatile and flammable liquid solvent, such as heptane.

BACKGROUND OF THE INVENTION

Recently there has been developed a high density recorded disc, such as a video disc, which contains a large number of revolutions of the recorded spiral path, about 10,000 per inch along the radius of the disc. One type of such recorded disc is made of a plastic material which is filled with conductive particles, i.e., conductive carbon black particles, such that the disc is thereby made conductive. This type of disc is more brittle than discs which do not contain these conductive particles.

These recorded discs of plastic material are generally flat, circular plates having information on one or both major surfaces thereof in the form of surface relief patterns formed along a spiral path or groove in a surface of the disc. These discs are formed or molded in a mold press having a pair of mold plates, at least one of which is movable toward and away from the other, and which when together form a mold cavity therebetween of a size and shape of the disc to be formed. Because of the fine dimensions of these recorded discs, many of the requirements for materials and processes used in the manufacture of these high density discs are different from those used previously to make audio discs.

During playback of these high density recorded discs, such as video discs, with a metal-tipped stylus, considerable friction is generated between the stylus and the disc surface. Therefore a means, such as the application of a surface lubricant which does not reduce the fidelity of the recording, must be provided to reduce the friction during playback. A suitable lubricant for these high density recorded discs, in addition to imparting good lubricity to the disc surface, must possess proper surface tension, adhesion to the disc surface, cohesion and elasto-hydrodynamic properties so as to form a uniform, thin film which will support the stylus at a constant height above the signal elements during playback. Also the lubricant must be stable against degradation due to wear, must resist evaporation and oxidation and have good electrical insulating properties with high dielectric strength. Additionally, the lubricant must be chemically inert to the materials of the disc itself, and possess good stability to high temperatures and high and low humidity conditions.

Therefore, in order to prevent undue wear between the disc and the stylus, a lubricant layer is applied to the disc surface, such as by evaporation, spraying from a solvent solution, or the like.

One of the preferred ways of applying the lubricant to the surface of a recorded disc is by spraying from solvent solution. However, it has been found that some of the preferred solvents for these disc lubricants are highly volatile and flammable, such that the use of these solvents, i.e., heptane, in the manufacturing environment or work place can be hazardous and unsafe. Therefore, there is a need for an improved process and apparatus for the safe supply, distribution and handling of a highly volatile and flammable liquid solvent, such as heptane, in the work environment. The fulfillment and satisfaction of this need resulted in the present invention.

SUMMARY OF THE INVENTION

A system for the safe supply, distribution, and delivery of a highly volatile and flammable liquid to a process area within a closed work environment includes a container for the storage of and for providing a source of supply of the liquid, with the container being positioned remote from the closed work environment. The system also includes a pipeline extending from within the container to the process area within the closed work environment to provide for the delivery of the liquid from the source of supply within the container to the process area within the closed work environment. The system further includes a protective casing spaced from and completely enclosing the pipeline from a point on the pipeline adjacent the process area within the closed work environment to a point on the pipeline closely adjacent the pipeline's entry into the closed work environment with the protective casing opening outwardly of the closed work environment to thereby trap within the space existing between the casing and the pipeline any vapors that may be escaping from the liquid within the pipeline for exhausting of the same outwardly of the closed work environment.

DETAILED DESCRIPTION OF THE INVENTION

Figure 1:
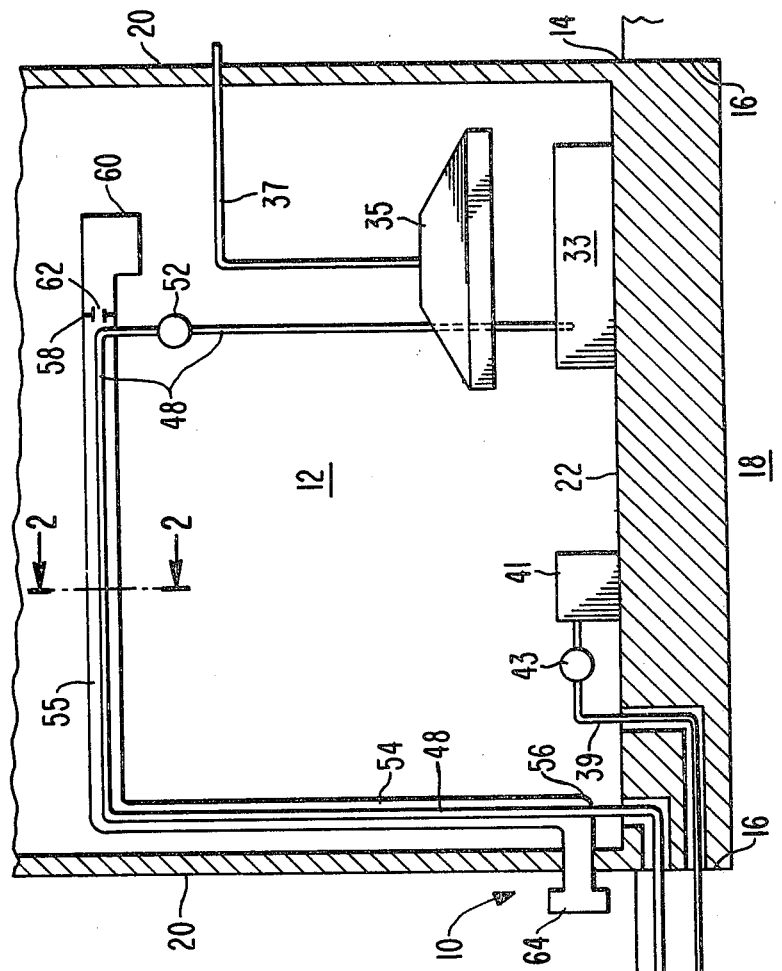
FIG. 1 is a side elevational view of a system for handling a highly volatile and flammable liquid which incorporates the present invention.

Referring specifically to FIG. 1, the improved system for handling a highly volatile and flammable liquid of this invention is generally designated by reference numeral 10. This improved system 10 is generally intended for use in conjunction with a closed environment or work place 12, such as a manufacturing facility or production plant. The closed work place 12 is generally provided by an enclosed building 14 having foundation footings 16 extending into the ground 18, sidewalls 20, and a roof (not shown). The building 14 usually also includes a floor 22 set within the ground 18 and extending above the surface 24 thereof.

In addition to the building 14, portions of the system 10 of the present invention are housed or contained within a storage or outbuilding 26 remote from the building 14 enclosing the work place 12. The storage building 26 includes a floor 28 set within the ground 18 and extending above the surface 24 thereof. The floor 28 is positioned between foundation walls or footings 30 extending down into the ground 18. The footings 30 support sidewalls 32 which in turn support a roof (not shown) thereby completing the storage building 26.

Turning now specifically to the system 10 for handling a volatile and flammable liquid solvent, such as heptane, the same includes the safe storage of the liquid as a source of supply for distribution to a processing area 33 in the enclosed work place 12 of building 14. Because the preferred solvents are highly volatile and highly flammable, it is advantageous to store the supply of these liquids at a point remote from the enclosed work environment12 and processing area 33. Suitable storage for these liquids is in an enclosed drum or tank 34 resting upon the floor 28 of the outbuilding 26, which is remote from the building 14 enclosing the work environment 12.

A flexible liquid flow line 36 extends downward into the drum 34 through which the liquid is withdrawn from the drum 34 by means of an air motor and pump 38 operably connected to the flow line 36. The air motor and pump 38 is driven by a source of compressed air flowing in air line 39, one end of which is connected to the air motor and pump 38. The air line 39 is positioned beneath the surface 24 of ground 18 and extends between building 14 and outbuilding 26. The other end of air line 39 is connected to an air compressor 41 in the building 14 to supply the source of compressed air for driving the air motor and pump 38. A control valve 43 is provided in the air line 39 adjacent compressor 41 to control the flow of air therefrom to the air motor and pump 38. Also functionally attached to the flow line 36 between the drum 34 and a shut-off valve 40, is a pressure relief valve 42 with a return line 44 extending into drum 34 and a flow regulator 46, all for controlling the flow of liquid from the supply thereof within the drum 34 into and through the system 10 to the processing area 33.

Connected to the other side of the valve 40, opposite the connection thereto of the flow line 36, is a metal pipeline 48 which provides for the flow of the liquid or solvent lubricant mixture from the building 26 to the process area 33 within the building 14. The pipeline 48 proceeds downward from the valve 40, through the floor 28 of building 26 and beneath the surface 24 of ground 18 through footing 30, and continues underground to thereafter enter the building 14 through the footing 16 and the floor 22 thereof. Thereafter, the pipeline 48 continues upward along the sidewall 20 of building 14 and then passes overhead within the building 14 to a point adjacently above the process area 33, from which it is directed downward to the processing area 33. A solenoid-operated shutoff valve 52 is connected to pipeline 48 to control the flow of the volatile and flammable liquid therein, at a point adjacently above the processing area 33. The processing area 33 is provided with an overhanging vent hood 35 having a vent line 37 connected to the hood's upper portion and extending outwardly of the building 14 through the sidewall 20. In this manner the enclosed work environment 12 within the building 14 is maintained relatively free of excess vapors from the highly volatile and flammable liquid used in the processing area 33.

Figure 2:
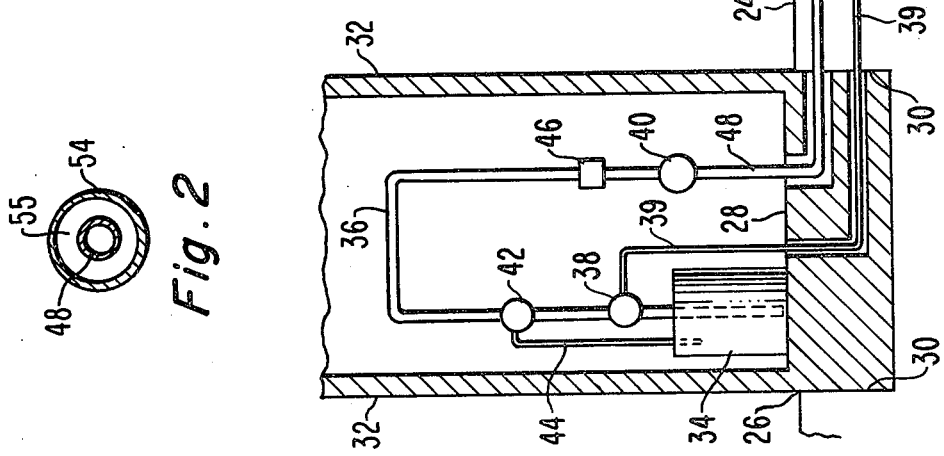
FIG. 2 is a cross-sectional view taken along line 2—2 of FIG. 1.

The pipeline 48 is provided with an encompassing protective pipe or casing 54 which is spaced from and positioned concentrically around the pipe 48. The protective outer pipe 54 encompasses the pipeline 48 from a point 56 closely adjacent the pipeline's entry into the building 14, to a point 58 adjacently above the processing area 33 and just prior to the attachment to line 48 of the valve 52. The outer pipe 54 serves as a protective shield encompassing the pipe line 48 within the enclosed work environment 12 provided by the building 14. In this way, should any of the highly volatile and flammable liquid escape from the pipe 48, the same will be maintained within the space or passageway 55 existing between the inner pipeline 48 and the outer pipe 54, see in particular FIG. 2.

In addition to the above and as an added safety feature, an air pump or fan 60 injects air into the space or opening 55 between the inner pipeline 48 and the outer pipe 54, via an opening 62 in the pipe 54 adjacent point 58. The injected air moves through the space 55 between the inner and outer pipes 48, 54 to exit the building 14 through a vapor detector 64 positioned through the sidewall 20 of building 14 and connected to the outer pipe 54 closely adjacent point 56. With the injected air continuously passing through the vapor detector 64, the same can continuously detect the concentration or change in concentration of any vapors picked up by the injected air from the highly volatile and flammable liquid flowing in the inner pipeline 48. Should these vapors reach some preset or undesirable level, the detector 64 will indicate the same and portions of or the entire system 10 can be shut down such as by closing the valve 41 thereby the flow of compressed air to the air motor and pump 38, either manually or automatically until the source of excess vapor can be traced and corrected.

In operation, and particularly with regard to the application of a lubricant to the surface of a recorded disc, the improved system 10 of this invention provides for the safe supply, handling and delivery of a highly volatile, flammable liquid solvent/lubricant mixture, such as heptane/lubricant, from a source thereof within the drum 34 positioned within the outbuilding 26 remote from the building 14 to the processing area 33 within enclosed work environment 12 for application to the surfaces of the recorded discs by spraying. This is accomplished by pumping the previously mixed solvent/lubricant solution from the drum 34 by means of the air motor and pump 38 through the flexible flow line 36, with the solution passing through pressure relief valve 42, flow regulator 46, and control valve 40 prior to entering pipeline 48. The liquid solvent/lubricant mixture in moving through the pipeline 48 exits the building 26 and travels beneath the surface 24 of the ground 18 prior to entering the building 14, after which it flows upward along the wall 20 and overhead enclosed within the outer protective pipe 54 to the solenoid-operated control valve 52. After passing the valve 52 the liquid solvent/lubricant mixture is brought via pipeline 48 to the processing area 33 for use in lubricating the surfaces of recorded discs. At all times when the system 10 is in operation the fan 60 will pump air into and through the space 55 between the inner 48 and the outer 54 pipes, constantly purging the same along with any possible solvent (heptane) vapors toward the outside of building 14, exiting the same through the vapor detector 64 within wall 20. Should excess heptane vapors be present in the system, they are monitored by the detector 64, such that an operator or the detector itself automatically may shut down portions of or the entire system, such that the enclosed workplace 12 is maintained in a safe, non-hazardous condition.

What is claimed is:

1. A system for the safe supply, distribution, and delivery of a highly volatile, flammable liquid to a process area within a closed work environment, comprising in combination:

an enclosed container for the storage of and for providing a source of supply of said liquid, said container being positioned remote from said closed work environment, a pipeline extending from within said container to said process area within said closed work environment, said pipeline providing for the delivery of said liquid from said source of supply to said process area, a protective casing spaced from and completely enclosing said pipeline from a point adjacent said process area within said closed work environment to a point closely adjacent said pipeline's entry into said closed work environment, said protective casing opening outwardly of said closed work environment to thereby trap within the space between said pipeline and casing any vapors escaping from said liquid within said pipeline for exhausting outwardly of said closed work environment, a fan means operably connected to said protective casing adjacent said process area, said fan means being adapted and arranged to inject air into the space between said casing and said pipeline thereby purging said space and exhausting said vapors outwardly of said closed work environment, and a vapor detector operably connected to said protective casing adjacent the point of its opening outwardly of said closed work environment, said vapor detector being arranged whereby said purging air passes therethrough and being adapted to sense said vapors within said purging air.

2. A system in accordance with claim 1 further including a pump operably connected to said pipeline adjacent said container for pumping said liquid from said container into and through said pipeline, and means for energizing said pump, said vapor detector being operably connected to said means for energizing said pump whereby upon said detector sensing the presence of said vapors above a preset level, said means for energizing are disrupted and said pump ceases the flow of said liquid in said pipeline.

3. A system in accordance with claim 2 further including a pressure-relief valve, and a flow regulator, said valve and regulator being operably connected to said pipeline adjacent to and downstream of said pump for regulating the flow of said liquid through said pipeline.

4. A system in accordance with claim 3 in which said closed work environment is provided by a building enclosing said process area, said building including a floor, walls, and a roof, said vapor detector opening outwardly of and being positioned through one of said building walls, and said container being housed within another building remote from said building providing said closed work environment.

5. A process for the safe supply, distribution, and delivery of a highly volatile and flammable liquid to a processing area within an enclosed work place comprising the steps of:

providing a source of supply of said liquid exteriorly of said enclosed work place, delivering said liquid from said source of supply exteriorly of said enclosed work place to said processing area within said enclosed work place by pipeline means, enclosing said pipeline means within said enclosed work place by protective casing means such that any vapors escaping from said liquid within said pipeline means within said enclosed work place are trapped within said casing means, venting said casing means exteriorly of said enclosed work place to thereby exhaust said vapors trapped within said casing means outwardly of said enclosed work place, purging said casing means by the use of air under pressure to positively remove and exhaust said vapors outwardly of said enclosed work place, and sensing said purging air as it is exhausted outwardly of said enclosed work place to detect the presence of said vapors within said purging air whereby said delivering of said liquid from said source of supply exteriorly of said enclosed work place to said processing area within said enclosed work place may be ceased upon detection of said vapors.

6. A process in accordance with claim 5 wherein said delivering step includes pumping said liquid from a source of supply provided by a container thereof housed in a building remote from said enclosed work place through said pipeline means to said processing area within said enclosed work place.

* * * * *